United States Patent
Arregui De La Cruz et al.

(10) Patent No.: US 10,079,672 B2
(45) Date of Patent: Sep. 18, 2018

(54) METHODS AND APPARATUS FOR PERFORMING FULL-DUPLEX COMMUNICATIONS USING A G.HN PROTOCOL

(71) Applicant: Marvell World Trade Ltd., St. Michael (BB)

(72) Inventors: Antonio Arregui De La Cruz, Castellon (ES); Agustin Badenes Corella, Valencia (ES); Salvador Iranzo Molinero, Betera (ES)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/483,241

(22) Filed: Apr. 10, 2017

(65) Prior Publication Data

US 2018/0069688 A1    Mar. 8, 2018

Related U.S. Application Data

(60) Provisional application No. 62/382,908, filed on Sep. 2, 2016, provisional application No. 62/382,913, filed on Sep. 2, 2016.

(51) Int. Cl.
*H04L 5/16* (2006.01)
*H04L 29/06* (2006.01)
(Continued)

(52) U.S. Cl.
CPC ............ *H04L 5/16* (2013.01); *H04B 17/364* (2015.01); *H04L 25/0202* (2013.01); *H04L 69/22* (2013.01); *H04W 56/0015* (2013.01)

(58) Field of Classification Search
None
See application file for complete search history.

(56) References Cited

U.S. PATENT DOCUMENTS 6,950,459 B1 * 9/2005 Palm .................... H04L 5/1438
    375/222
7,636,327 B1 * 12/2009 Doran ...................... H04L 5/14
    370/260

(Continued)

FOREIGN PATENT DOCUMENTS

GB      2 498 561      7/2013
WO   WO 2011/011572   1/2011

OTHER PUBLICATIONS

Marvell Semiconductor Inc., "Evolution of G.hn: Performance of a 10Gbps G.hn full duplex system on a coax network," *ITU—Telecommunication Standardization Sector, Document 2016-07-Q18-031*, Geneva, Switzerland, Aug. 10, 2016, Retrieved from the internet https://www.itu.int/ifa/ties/Mtgs16/Q18/2016-07-Q18-031.docx, pp. 1-14.

(Continued)

Primary Examiner — Brian Roberts

(57) ABSTRACT

Methods and apparatus for performing full-duplex communications using a G.hn protocol are provided. A second node of a plurality of nodes is selected, by a first node with which to engage in full-duplex communications. A first seed common to the plurality of nodes is retrieved. A search is performed for a second seed assigned to the second node. A first portion of a frame is generated for transmission using a half-duplex communications mode, wherein transmissions using the half-duplex communications mode are detectable by each of the nodes. A first group of subcarriers is loaded with the first set of phases generated using the first seed and a second group of subcarriers is loaded with the second set of phases generated using the second seed. The first portion is transmitted, in the half-duplex communications mode, from the first node using the first and second groups of subcarriers.

21 Claims, 4 Drawing Sheets

(51) Int. Cl.
*H04B 17/364* (2015.01)
*H04L 25/02* (2006.01)
*H04W 56/00* (2009.01)

(56) References Cited

U.S. PATENT DOCUMENTS

| | | |
|---|---|---|
| 2009/0067352 A1 | 3/2009 | Wang |
| 2009/0296609 A1* | 12/2009 | Choi .................. H04W 72/121 370/281 |
| 2010/0323669 A1* | 12/2010 | Maggenti .......... H04M 3/42221 455/413 |
| 2015/0009865 A1* | 1/2015 | Sharma .................... H04L 5/16 370/277 |
| 2017/0026081 A1 | 1/2017 | Jung |

OTHER PUBLICATIONS

Rapporteur for Q18/15., "G.hn: Issues List (G.hn and G.cx)," *ITU-Telecommunication Standardization Sector, Temporary Document 2016-07-Q18-U01 R2*, Geneva, Switzerland, Aug. 10, 2016, Retrieved from https://www.itu.int/ifa/ties/Mtgs16/Q18/2016-07-Q18-U01R2.docx, pp. 1-75.

* cited by examiner

METHODS AND APPARATUS FOR PERFORMING FULL-DUPLEX COMMUNICATIONS USING A G.HN PROTOCOL

CROSS REFERENCE TO RELATED APPLICATIONS

This disclosure claims the benefit of U.S. Provisional Application Nos. 62/382,913, filed Sep. 2, 2016 and 62/382,908, filed Sep. 2, 2016, which are incorporated herein by reference in their entireties.

FIELD OF USE

The present disclosure relates generally to orthogonal frequency division multiplexing (OFDM) communication systems, and more particularly to G.hn communications systems.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

G.hn is a communications protocol typically used for home networking. This protocol is typically used for communicating information over various types of wired mediums (e.g., telephone wiring, coaxial cables and power lines). The G.hn Media Access Control (MAC) uses a protocol for communicating information using OFDM using a time division multiple access (TDMA) architecture, Transmission Opportunities (TXOPs) are scheduled for the various devices. Although the typical G.hn protocol allows point-to-point (P2P), point-to-multipoint (P2MP) or multipoint-to-multipoint (MP2MP or mesh) topologies, only half-duplex communications are enabled. Accordingly, inasmuch as only one device is able to transmit information to one or more other devices at a particular frequency and at a particular moment in time, there are inherent inefficiencies that slow down communications.

SUMMARY

Methods and apparatus for performing full-duplex communications using a G.hn protocol in OFDM communications systems are provided. In some embodiments, a first node of a plurality of nodes selects a second node of the plurality of nodes with which to engage in full-duplex communications. A first seed common to the plurality of nodes is retrieved. A search is performed for a second seed assigned to the second node. The first and second seeds are used to generate respective first and second sequences of bits. The first and second sets of phases are generated based on the first and second sequences of bits, respectively. The first node generates a first portion of a communications frame for transmission using a half-duplex communications mode. Transmissions using the half-duplex communications mode are detectable by each of the plurality of nodes. A first group of subcarriers in a set of subcarriers is loaded with the first set of phases generated using the first seed and a second group of subcarriers in the set of subcarriers is loaded with the second set of phases generated using the second seed. The first portion is transmitted, in the half-duplex communications mode, from the first node using the first and second groups of subcarriers.

In some embodiments, the first group of subcarriers includes only even subcarriers in the set of subcarriers and the second group of subcarriers includes only odd subcarriers in the set of subcarriers. The first frame includes a preamble portion, a header portion, an automatic gain control portion, a channel estimate portion, and a data portion. The first portion includes the preamble portion.

In some embodiments, the preamble portion indicates to each of the plurality of nodes that subsequent portions, following the header portion, of the frame will be transmitted using a full-duplex communications mode.

In some embodiments, the first and second seeds are applied to a linear feedback shift register (LFSR) to generate the first and second sets of phases.

In some embodiments, an exchange of full-duplex frame portions is synchronized. A propagation delay between each of the first and second nodes and a reference node that provides a common time reference is measured. A transmission time of the full-duplex frame portions is adjusted based on the propagation delay.

In some embodiments, a second portion of the frame is transmitted using the half-duplex communications mode and includes header that indicates a duration of the frame.

In some embodiments, the first portion includes a preamble. The first portion is received with the second node. The second node determines whether the first portion was transmitted using the second seed assigned to the second node. In response to determining the first portion was transmitted using the second seed assigned to the second node, a full-duplex frame is transmitted to the first node in full-duplex. The full-duplex frame is decodable by the first node and not by other nodes in the plurality of nodes.

In some embodiments, the full-duplex frame includes a plurality of portions. The plurality of portions includes an automatic gain control portion, at least one channel estimate portion, a header portion and a data portion.

In some embodiments, the full-duplex frame includes a predetermined channel estimate portion and a negated predetermined channel estimate portion. A seed different from a seed associated with a channel estimation portion transmitted by the first node is selected. Subcarriers of the second node are loaded with phases generated using the selected seed. A first repetition of the predetermined channel estimate portion is transmitted using the subcarriers of the second node and a second repetition of the negated predetermined channel estimate portion is transmitted using the subcarriers of the second node.

In some embodiments, the full-duplex frame is transmitted by the second node at a same time and at a same frequency as a second portion of the frame is transmitted by the first node.

In some embodiments, transmission circuitry associated with subcarrier circuitry is included in an apparatus. The subcarrier circuitry includes a set of subcarrier components. The apparatus includes control circuitry of a first node of a plurality of nodes. The control circuitry is configured to select a second node of the plurality of nodes with which to engage in full-duplex communications. The control circuitry is configured to retrieve a first seed common to the plurality of nodes. The control circuitry is configured to search for a second seed assigned to the second node, wherein the first and second seeds are used to generate respective first and second sequences of bits, wherein first and second sets of phases are generated based on the first and second sequences of bits, respectively. The control circuitry is configured to generate a first portion of a communications frame for transmission using a half-duplex communications mode, wherein transmissions using the half-duplex communications mode are detectable by each of the plurality of nodes. The control circuitry is configured to load a first group of subcarriers in the set of subcarriers with a first set of phases generated using the first seed and load a second group of subcarriers in the set of subcarriers with a second set of phases generated using the second seed. The control circuitry is configured to cause the transmission circuitry to transmit, in the half-duplex communications mode, the first portion from the first node using the first and second groups of subcarriers.

In some embodiments, the first group of subcarriers includes only even subcarriers in the set of subcarriers and the second group of subcarriers includes only odd subcarriers in the set of subcarriers, wherein the first frame includes a preamble portion, a header portion, an automatic gain control portion, a channel estimate portion, and a data portion, and wherein the first portion includes the preamble portion.

In some embodiments, the preamble portion indicates to each of the plurality of nodes that subsequent portions, following the header portion, of the frame will be transmitted using a full-duplex communications mode.

In some embodiments, the apparatus includes a linear feedback shift register (LFSR), wherein the control circuitry is further configured to apply the first and second seeds to the LFSR to generate the first and second sets of phases.

In some embodiments, the control circuitry is further configured to synchronize an exchange of full-duplex frame portions by measuring a propagation delay between each of the first and second nodes and a reference node that provides a common time reference. The control circuitry is further configured to adjust a transmission time of the full-duplex frame portions based on the propagation delay.

In some embodiments, a second portion of the frame is transmitted using the half-duplex communications mode and includes header that indicates a duration of the frame.

In some embodiments, the first portion includes a preamble, wherein the second node includes control circuitry, receiver circuitry and transmission circuitry. The control circuitry of the second node is configured to receive the first portion from the receiver circuitry. The control circuitry of the second node is configured to determine whether the first portion was transmitted using the second seed assigned to the second node. The control circuitry of the second node is configured to in response to determining that the first portion was transmitted using the second seed assigned to the second node, cause the transmission circuitry of the second node to transmit a full-duplex frame to the first node in full-duplex, wherein the full-duplex frame is decodable by the first node and may not be decodable by other nodes in the plurality of nodes.

In some embodiments, the full-duplex frame includes a plurality of portions, wherein the plurality of portions includes an automatic gain control portion, at least one channel estimate portions, a header portion and a data portion.

In some embodiments, the control circuitry of the second node is configured to select a seed different from a seed associated with a channel estimation portion transmitted by the first node. The control circuitry of the second node is configured to load subcarriers of the second node with phases generated using the selected seed. The control circuitry of the second node is configured to instruct the transmission circuitry of the second node to transmit a first repetition of a predetermined channel estimate portion using the subcarriers of the second node and a second repetition of a negated predetermined channel estimate portion using the subcarriers of the second node.

In some embodiments, the control circuitry of the second node is configured to transmit the full-duplex frame at a same time and at a same frequency as the control circuitry of the first node transmits a second portion of the frame.

In some embodiments, a first node of a plurality of nodes selects a second node of the plurality of nodes with which to engage in full-duplex communications, wherein the plurality of nodes are coupled to each other over a communications network. A signal is transmitted in a half-duplex communications mode over the communications network, wherein transmissions over the communications network in the half-duplex communications mode are detectable by all of the plurality of nodes. Each of the plurality of nodes is caused to determine, based on receiving the signal, that subsequent transmissions over the communications network will be performed in a full-duplex communications mode. The second node is caused to establish, based on receiving the signal, full-duplex communications in a full duplex communications mode with the first node, wherein transmissions in the full duplex communications mode are decodable by the first node and not by other nodes in the plurality of nodes.

BRIEF DESCRIPTION OF THE DRAWINGS

The details of one or more implementations are set forth in the accompanying drawings and the description below. Other features and various advantages will be more apparent upon consideration of the following detailed description, taken in conjunction with the accompanying drawings in which.

DETAILED DESCRIPTION

Figure 1:
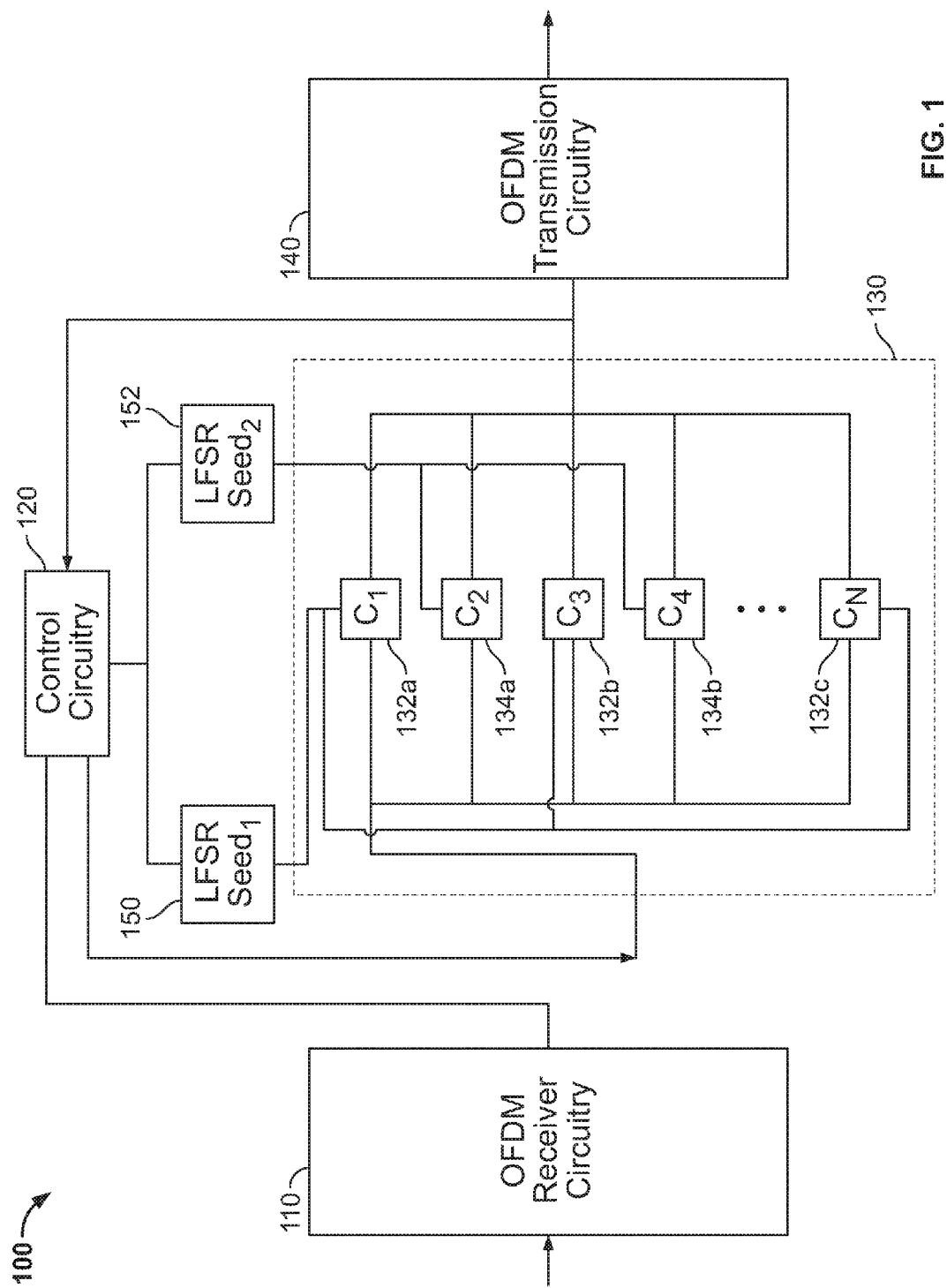
FIG. 1 is a diagram of an illustrative G.hn communications system for engaging in full-duplex communications in accordance with an embodiment of the present disclosure.

This disclosure generally relates to performing full-duplex communications using a G.hn protocol in OFDM communications systems. For illustrative purposes, this disclosure is described in the context of wired communications system implementing the G.hn protocol. It is noted, however, that this disclosure is applicable to any other type of wired or wireless communications system (e.g., any other OFDM system, a system implementing any other G.hn protocol, or other wired or wireless local or wide area network system).

In some embodiments, a first node selects to perform full-duplex communications with a second node of a plurality of nodes. The first node is configured to transmit a first section of a frame (e.g., a section of a frame that includes two portions, a preamble and header) to a communications medium (a wired power line) for receipt by the plurality of nodes. This first section of the frame is transmitted in a half-duplex mode of communication such that all of the plurality of nodes are potentially capable of decoding the first section. In order to inform the nodes about which node has been selected, the first node is configured to transmit a preamble portion of the section of the frame using a pseudorandom value generator seed that is specific to the second node and another pseudorandom value generator seed that is common to all of the nodes. The preamble portion is configured to be transmitted using a first group of carriers (e.g., even carriers) that are configured based on values output by a pseudorandom value generator initiated with the common seed; and using a second group of carriers (e.g., odd carriers) that are configured based on values output by a pseudorandom value generator initiated with the seed specific to the second node. The header portion of the first frame section is configured to be transmitted according to the typical G.hn manner. Following the transmission of the first section of the frame, the first and second nodes exchange a second section of the frame (that includes channel estimate information portions and data portions) in a full-duplex mode of communication (e.g., using all of the carriers at the same time and frequency).

As referred to herein, the term "half-duplex" refers to a mode of communication in which any node in a network of nodes is capable of decoding the communication. For example, in the half-duplex mode of communication, nodes transmits information on a particular frequency, one at a time (e.g., in an assigned time slot). As referred to herein, the term "full-duplex" refers to a mode of communication in which two nodes in a network communicate at the same time and in the same frequency such that only the nodes that are communicating in the full-duplex mode are capable of decoding the communications transmitted. For example, in the full-duplex mode of communication, first and second nodes transmits information on a particular frequency at the same time such that other nodes in the network perceive only noise in the signals and are unable to decode the communication between the first and second nodes.

FIG. 1 is a diagram of an illustrative G.hn communications system 100 for engaging in full-duplex communications in accordance with an embodiment of the present disclosure. System 100 is configured to be implemented by each of a plurality of nodes in an OFDM network implementing the G.hn protocol. System 100 includes OFDM receiver circuitry 110, control circuitry 120, subcarrier circuitry 130, LFSR seed 1 circuitry 150, LFSR seed 2 circuitry 152, and OFDM transmission circuitry 140.

As explained below, LFSR seed 1 circuitry 150 and LFSR seed 2 circuitry 152 each or in combination include logic circuitry (that implements a pseudorandom technique, such as a linear feedback shift register (LFSR)) that generates a pseudorandom value or number based on a seed value. The seed is a value that is provided to the logic circuitry (that implements the pseudorandom technique) for generating the pseudorandom numbers. For example, the LFSR generates a sequence of bits (e.g., pseudorandom values) that depends on the applied seed. This sequence of bits is converted to phases (e.g., taking every two bits of the sequence and mapping the values to 0, 90, 180 or 270 degrees) and then each phase is loaded into a different subcarrier of a set of subcarriers. In some implementations, the initial sequence of bits that is generated by each LFSR seed 1 circuitry 150 and LFSR seed 2 circuitry 152 is the same if the same seed value is used. As such, two different nodes that each use their own LFSR seed 1 circuitry 150 and LFSR seed 2 circuitry 152 may be configured to generate the same sequence of bits when the two nodes operate these circuitries using the same seed value.

Figure 4:
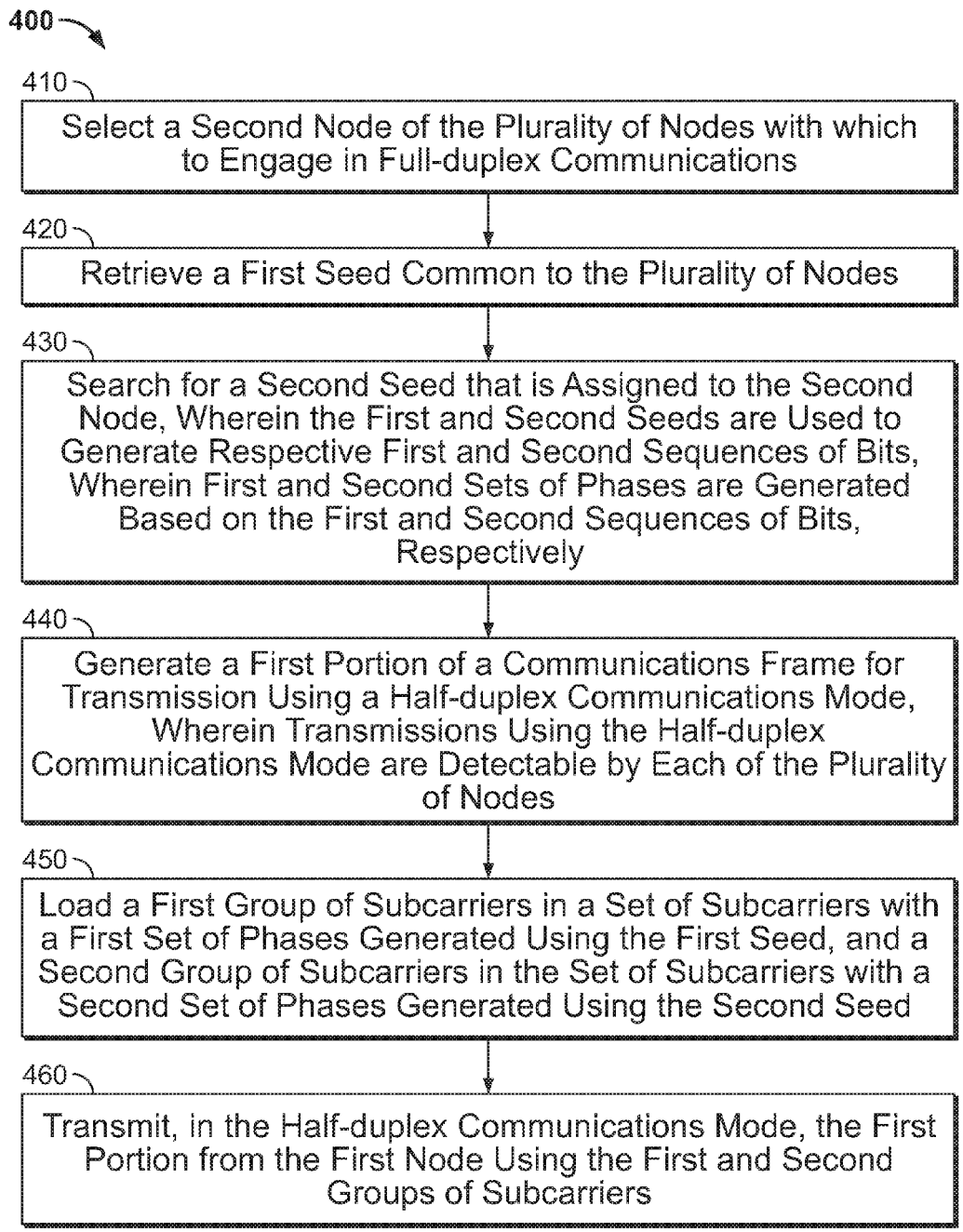
FIG. 4 illustrates a process for performing full-duplex communications using a G.hn protocol in accordance with an embodiment of the present disclosure.

Control circuitry 120 is configured to be based on any suitable processor or processing circuitry. Control circuitry 120 is configured to control some or all components of communication system 100. Control circuitry 120 is configured to receive and run instructions for implementing a process for transmitting half-duplex and/or full-duplex frames in the G.hn protocol. Such instructions are configured to be stored in a storage device (not shown) in communication system 100. For example, control circuitry 120 is configured to receive instructions for implementing process 400 (FIG. 4).

Control circuitry 120 is configured to receive data from another system component via receiver circuitry 110 and is configured to instruct LFSR seed 1 circuitry 150 and/or LFSR seed 2 circuitry 152 to generate pseudorandom values based on seeds and output phases corresponding to the generated pseudorandom values. Each phase output from LFSR seed 1 circuitry 150 and/or LFSR seed 2 circuitry 152 is provided to a respective subcarrier in a group of subcarriers in subcarrier circuitry 130 that generates a symbol for transmission using transmission circuitry 140 in accordance with the G.hn protocol. Subcarrier circuitry 130 is configured to generate a frame 200 (FIG. 2) that includes various sections (e.g., preamble, header, automatic gain control (AGC), channel estimate, and data). In some embodiments, the sections and/or portions in frame 200 following the channel estimate are of equal size. Subcarrier circuitry 130 is configured to provide the generated frame to transmitter 140 for transmission over one or more wired or wireless mediums (e.g., power line or telephone line) to another node (e.g., a receiver). Transmission circuitry 140 is configured to be any transmitter circuitry that transmits OFDM signals in accordance with the G.hn protocol.

LFSR seed 1 circuitry 150 and/or LFSR seed 2 circuitry 152 are configured to include one or more linear feedback shift register (LFSR) circuitries and/or any other type of circuitry that is configured to implement a pseudorandom value generator to generate a pseudorandom number based on a seed. LFSR seed 1 circuitry 150 and/or LFSR seed 2 circuitry 152 are configured to output to subcarrier circuitry 130 one or more phases corresponding to the pseudorandom number generated by the LFSR circuitry. The phases output by LFSR seed 1 circuitry 150 and/or LFSR seed 2 circuitry 152 are referred to as the values output by LFSR seed 1 circuitry 150 and/or LFSR seed 2 circuitry 152. In some implementations, LFSR seed 1 circuitry 150 is configured to include a first LFSR circuitry, and LFSR seed 2 circuitry 152 is configured to include a second LFSR circuitry. In some implementations, LFSR seed 1 circuitry 150 and LFSR seed 2 circuitry 152 are configured to be implemented by a single LFSR circuitry that generates a first pseudorandom value based on a first seed (e.g., the seed corresponding to LFSR seed 1 circuitry 150) at a first point in time and that generates a second pseudorandom value based on a second seed (e.g., the seed corresponding to LFSR seed 2 circuitry 152) at a second point in time. In such circumstances, the single LFSR circuitry is coupled to each subcarrier in subcarrier circuitry 130 and provides phases based on a first seed to each carrier in first group of carriers 132a-c during a first set of time intervals and provides phases based on a second seed to each carrier in second group of carriers 134a-b during a second set of time intervals.

In some implementations, LFSR seed 1 circuitry 150 and/or LFSR seed 2 circuitry 152 are configured to each be coupled to every carrier of subcarrier circuitry 130. In some implementations, LFSR seed 1 circuitry 150 is configured to be coupled to a first group of carriers 132a-c (e.g., only odd subcarriers) of subcarrier circuitry 130, and LFSR seed 2 circuitry 152 is configured to be coupled to a second group of carriers 134a-b (e.g., only even subcarriers) of subcarrier circuitry 130. In some implementations, when LFSR seed 1 circuitry 150 and LFSR seed 2 circuitry 152 are implemented by a single LFSR circuitry, during a first point in time, a first value corresponding to a first seed corresponding to LFSR seed 1 circuitry 150 is configured to be provided to one of the carriers in a first group of carriers 132a-c (e.g., only odd subcarriers) of subcarrier circuitry 130. At a second point in time, a second value corresponding to a second seed corresponding to LFSR seed 2 circuitry 152 is configured to be provided to one of the carriers in a second group of carriers 134a-b (e.g., only even subcarriers) of subcarrier circuitry 130.

In some implementations, each value generated by LFSR seed 1 circuitry 150 is output to a single carrier of first group of carriers 132a-c at a given time. In order to load all of the carriers in the first group of carriers 132a-c, multiple different values are generated by LFSR seed 1 circuitry 150 at different times. At each different time, the value provided by LFSR seed 1 circuitry 150 is loaded into a next carrier in first group of carriers 132a-c. Accordingly, in order to load all of the carriers in first group of carriers 132a-c, the LFSR in LFSR seed 1 circuitry 150 is shifted a number of time corresponding to the number of carriers in first group of carriers 132a-c. In some implementations, each value generated by LFSR seed 2 circuitry 152 is output to a single carrier of second group of carriers 134a-b at a given time. In order to load all of the carriers in the second group of carriers 134a-b, multiple different values are generated by LFSR seed 2 circuitry 152 at different times. At each different time, the value provided by LFSR seed 2 circuitry 152 is loaded into a next carrier in second group of carriers 134a-b. Accordingly, in order to load all of the carriers in second group of carriers 134a-b, the LFSR in LFSR seed 2 circuitry 152 is shifted a number of time corresponding to the number of carriers in second group of carriers 134a-b.

Each carrier of subcarrier circuitry 130 is configured to map a received frame to a different constellation or phase of a given frequency based on the value received from LFSR seed 1 circuitry 150 and/or LFSR seed 2 circuitry 152. Subcarrier circuitry 130 is configured to be coupled to transmission circuitry 140 to transmit the mapped frame over a given frequency. Subcarrier circuitry 130 is configured to be coupled to control circuitry 120 to provide data that has been received by receiver circuitry 110 and demodulated by subcarrier circuitry 130.

In some embodiments, full-duplex communications are configured to be initiated by a first node in a network of nodes in the G.hn OFDM system. In some implementations, in order to engage in full-duplex communications, the first node is configured to transmit a first frame section in a half-duplex mode for receipt by the plurality of nodes in the network. A portion of the transmitted frame section is configured to signal to other nodes on the network that full-duplex communications are going to be performed over the network and is configured to identify a second of the nodes in the network with which the full-duplex communications will be performed. Following the transmission of the first frame section, subsequent sections of the frame transmitted by the first node are transmitted in a full-duplex mode and are decodable by the second node but may not be decodable by other nodes.

In some implementations, in order to generate a first portion (e.g., a preamble portion which may include a predetermined set of OFDM mini-symbols) of the first frame section that is transmitted in the half-duplex mode, control circuitry 120 of the first node is configured to initially select the second node with which to perform full-duplex communications. Control circuitry 120 of the first node is configured to retrieve a first seed that is common to each of the nodes in the network of nodes. Control circuitry 120 of the first node is configured to search for a second seed that is associated with only the second node in the network of nodes. In some implementations, a storage device in the first node is configured to include a database that associates each node in the network with a given seed. Control circuitry 120 of the first node is configured to search the database on the storage device to identify the second seed associated with the second node.

Figure 2:
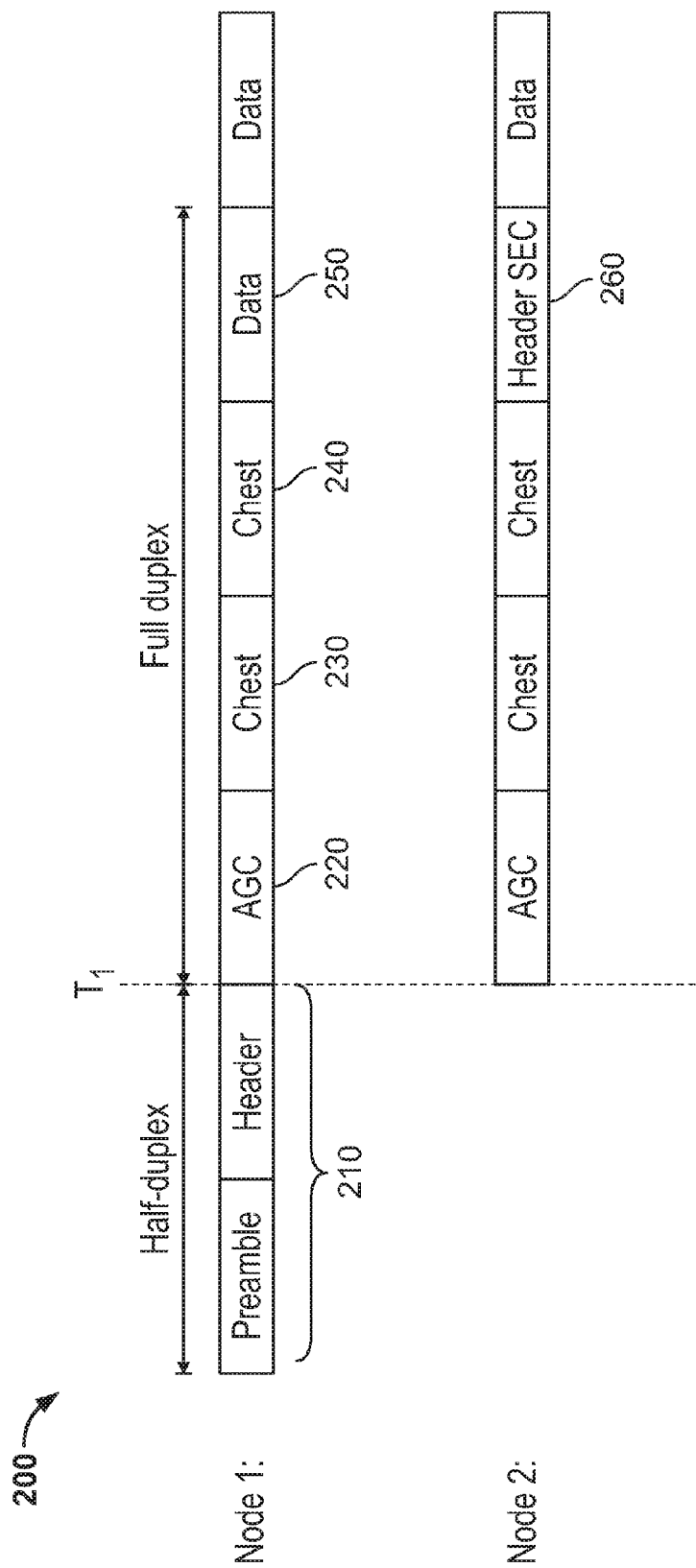
FIG. 2 is a diagram of illustrative frames exchanged in full-duplex communications in accordance with an embodiment of the present disclosure.

Control circuitry 120 of the first node is configured to generate the first section of the frame. For example, as shown in FIG. 2, first section 210 is configured to include a preamble portion and a header portion. The preamble portion of the frame is configured to include a predetermined series of OFDM mini-symbol repetitions, similar to S1 and S2 sections of a typical G.hn half-duplex mode. In some implementations, the S2 section of the frame portion is configured to be decodable by every node in the network and used to ensure time synchronization among the network nodes. The preamble mini-symbols are configured to be formed by loading odd/even preamble OFDM carriers with phases from an LFSR. The seed used to generate the phases for the odd carriers of the LFSR is configured to be different from the seed used to generate the phases for the even carriers of the LFSR. For example, control circuitry 120 of the first node is configured to load LFSR seed 1 circuitry 150 with the first seed that is common to each node in the network. Control circuitry 120 of the first node is configured to load LFSR seed 2 circuitry 152 with the second seed that is associated with only the second node. The values generated by LFSR seed 1 circuitry 150 are configured to be provided to odd carriers 132a-c (one at a time), and values generated by LFSR seed 2 152 circuitry are configured to be provided to even carriers 134a-b (one at a time). The frame section is configured to be mapped by subcarrier circuitry 130 to generate an OFDM mini-symbol for transmission to each node in the network.

As referred to herein, any operation discussed as being performed by a given node should be understood to be implemented and performed by one or more components of that node (e.g., control circuitry 120, receiver circuitry 110, transmission circuitry 140, and carrier circuitry 130).

Each node in the network of nodes is configured to receive the frame section transmitted by the first node. When a given node receives the transmitted frame section, control circuitry 120 of the given node is configured to be able to detect the preamble portion of the frame section. Each node detects the preamble using the common seed on the first group of carriers (e.g., odd numbered carriers). For example, each node checks if the observed received signal matches the expected sequence of phases generated by LFSR seed 1 circuitry 150 a of the given node. In particular, the receiving node checks whether the phase difference between consecutive carriers of the same carrier group (e.g., first group of carriers 132a-c) matches an expected phase difference computed from a known sequence of phases (e.g., corresponding to the preamble). In response to detecting a match between the consecutive carriers and the expected phase difference corresponding to the common seed, the node detects the preamble. Further, as discussed below, if a given node also detects a match between expected phase differences corresponding to a seed specific to the given node, the node determines that full-duplex communications are intended for the given node. Following detection of the preamble, each of the nodes is configured to decode a header symbol to determine a frame duration indicating when the channel will be free (e.g., after the first and second nodes complete the exchange of full-duplex communications). In particular, if a given node does not detect the preamble using the seed specific to the given node, the given node avoids communicating on the channel until the end of the frame duration.

The preamble is configured to also identify the second node with which the first node intends to engage in full-duplex communications. In order for a given node (e.g., the second node) to determine whether the node was selected for full-duplex communications, control circuitry 120 of the second node is configured to search the second group of carriers (e.g., the even numbered carriers—second group of carriers 134a-b) to determine whether the transmitted preamble frame portion was sent using the seed that is associated with only the second node. For example, each node checks if the observed received signal matches the expected sequence of phases generated by LFSR seed 2 circuitry 152 of the given node. In particular, the receiving node checks whether the phase difference between consecutive carriers of the same carrier group (e.g., second group of carriers 134a-b) matches an expected phase difference computed from a known sequence of phases (e.g., corresponding to the preamble). Because the preamble portion was generated using phases based on a seed specific to the second node in the network and transmitted using second group of carriers 134a-b, only the second node will determine that the phase difference between consecutive carriers of second group of carriers 134a-b matches the expected phase difference computed based on the seed specific to the second node. Other nodes may use their own specific seed to detect the phase difference on second group of carriers 134a-b which results in these nodes not detecting a match between the observed and expected phases. As such, in response to detecting a match between the consecutive carriers and the expected phase difference corresponding to the seed specific to the second node, the second node detects the preamble and is thereby informed that the second node has been selected by the first node to engage in full-duplex communications. In particular, if control circuitry 120 of the second node determines that the transmitted preamble frame portion was sent using the seed that is associated with only the second node, the second node is configured to determine that the second node has been selected by the first node to engage in full-duplex communications.

The header portion of the frame section transmitted in half-duplex is configured to inform each node about the frame duration and provide other time synchronizing information, such as guard interval. Each node is configured to decode the header to determine the information contained in the header.

In some embodiments, control circuitry 120 of the second node is configured to detect the preamble portion and decode the header portion in first section 210 of the transmitted frame, and the second node is configured to also extract information needed for receiving full-duplex data transmissions from the first node. For example, the second node is configured to extract frame duration and the guard interval (GI), for example, which may need to be equal for the first and second nodes.

Following transmission of first frame section 210, the first and second nodes begin to exchange communications in full-duplex at the same frequency and at the same time. For example, the first node is configured to transmit a second frame section that includes an automatic gain control (AGC) portion 220, a first repetition of a channel estimate portion 230, a second repetition of a channel estimate portion 230, and a data portion 250. For example, the second node is configured to transmit the second frame section that includes an automatic gain control portion, a first repetition of a channel estimate portion, a second repetition of a channel estimate portion, a header SEC portion 260 and a data portion.

In some embodiments, in order to ensure that the first and second nodes transmit the second frame section (e.g., a full-duplex frame section) at the same time, each node is configured to synchronize transmission based on a reference node that provides a common time reference. For example, the first and second nodes are configured to each measure a propagation delay between each of the first and second nodes and a reference node. The nodes are configured to store the propagation delay in a storage device. The nodes are configured to adjust timing of their respective transmissions of the full-duplex frame section based on the propagation delay (e.g., the first node is configured to delay further transmission by an amount corresponding to the propagation delay).

In some implementations, AGC portion 220 that is transmitted by the first and second nodes in a specific format and length is configured to either be formed by mini-symbol repetitions, or simply by a cyclic extension of the first channel estimate (CHEST) symbol of channel estimate portion 230 (FIG. 2). In some implementations, the first node is configured to use a different seed from the second node in generating AGC portion 220.

In some embodiments, the first and second nodes are configured to each send two repetitions of a channel estimation symbol, built from a known sequence of phases as first and second CHEST portions 230 and 240. CHEST portions 230 and 240 include a channel estimate symbol and/or any other suitable OFDM symbol and/or a guard interval (GI). In some embodiments, the first and second nodes are configured to each send one repetition of the channel estimation symbol as CHEST portion 230 and not transmit CHEST portion 240. The first and second nodes are configured to make use of CHEST portions 230 and 240 to estimate echo and remote channel. By generating echo and remote channel estimates, for example, the first node is configured to be able to decode a full-duplex signal sent by the second node (transmitted in the same frequency and time by both the first and second nodes) by cancelling out the signal transmitted by the first node.

In some implementations, the first and second nodes are configured to use a same seed to generate and transmit one CHEST portion 230 and 240. In such circumstances, the first node is configured to use only a first group of carriers (e.g., only the even carriers) to transmit CHEST portions 230 and 240, and the second node is configured to use only a second group of carriers (e.g., only the odd carriers) to transmit CHEST portions 230 and 240. This may allow the echo and remote channel estimation to be performed using half of the carriers, and a single CHEST symbol. In such circumstances, the echo and remote channels are configured to be completed by the first and second nodes by interpolation. In such circumstances, a given power boost (e.g., a 3 dB power boost) may be applied to the transmitted CHEST portions to improve channel estimation. In such circumstances, only one repetition of the channel estimate may be necessary. Accordingly, in such circumstances, only the first and second nodes exchange only CHEST portion 230 and do not exchange CHEST portion 240.

In some implementations, the first and second nodes are configured to use different seeds to generate CHEST portions 230 and 240 and are configured to each transmit these portions using all the carriers in subcarrier circuitry 130. In such circumstances, the first and second nodes are configured to use Walsh-Hadamard sequences to generate and transmit these portions (e.g., in a similar manner as an ACE symbol is generated and transmitted in MIMO G.hn schemes). For example, the first node is configured to transmit a predetermined channel estimate twice, once in CHEST portion 230 and again in CHEST portion 240. The second node is configured to transmit the same predetermined channel estimate once in CHEST portion 230 and a negated version of the predetermined channel estimate (e.g., -CHEST) in CHEST portion 240. Such symbol structure achieves orthogonality between the first and second nodes.

In some embodiments, the first and second nodes are configured to transmit the channel estimates in an alternative manner. In such circumstances, the same or different seed is configured to be used and all of the subcarriers are configured to be used. For example, the first node is configured to transmit the known channel estimate in CHEST portion 230 while the second node transmits silence in CHEST portion 230. Then, the first node is configured to transmit silence in CHEST portion 240 while the second node transmits the known channel estimate in CHEST portion 240. The use of the silence period is configured to allow isolated echo and remote channel estimation.

In some embodiments, following transmission of CHEST portion 240, the second node is configured to receive and decode data portion 250 from the first node. Data portion 250 includes one or more OFDM data symbols and/or a GI. Accordingly, the first node is configured to start generating data payload symbols (DATA, PROBE, etc.) and include them in data portion 250. Data portion 250 of the frame transmitted by the first node is configured to be transmitted by the first node simultaneously (at the same time and in the same frequency), using all the carriers, with the second node transmitting data portion 250 of the frame transmitted by the second node. In some implementations, the first and second nodes use different seeds to exchange communications in the full-duplex mode (e.g., to transmit the second frame section). The second node, while the first node transmits the first data portion, is configured to transmit header SEC portion 260 towards the first node. Header SEC portion 260 is configured to include information regarding the second node's own transmission and/or control information. In some implementations, header SEC portion 260 is configured to occupy a length of a whole OFDM symbol, like header portion of first section 210 and other portions in the second section of the frame. In some implementations, header SEC portion 260 is configured to be an FEC block that is transmitted with known bit-loading. In some implementations, header SEC portion 260 is configured to be provided as a signal in a control channel that is intermingled with payload data portion 250 by the second node. In some implementations, header SEC portion 260 may be part of data portion 250.

In some embodiments, the first node is configured to grant a maximum duration for second node transmission independent of the first node's own required transmission. This is configured to allow the second node to transmit longer even if the first node has smaller amount of data to transmit. In some implementations, the second node is configured to signal to the first node the second node's own duration (within limits imposed by the first node) in header SEC portion 260. In some embodiments, after the second node transmits header SEC portion 260 and if the full-duplex frame duration allows, the second node is configured to also transmit payload data symbols.

Figure 3:
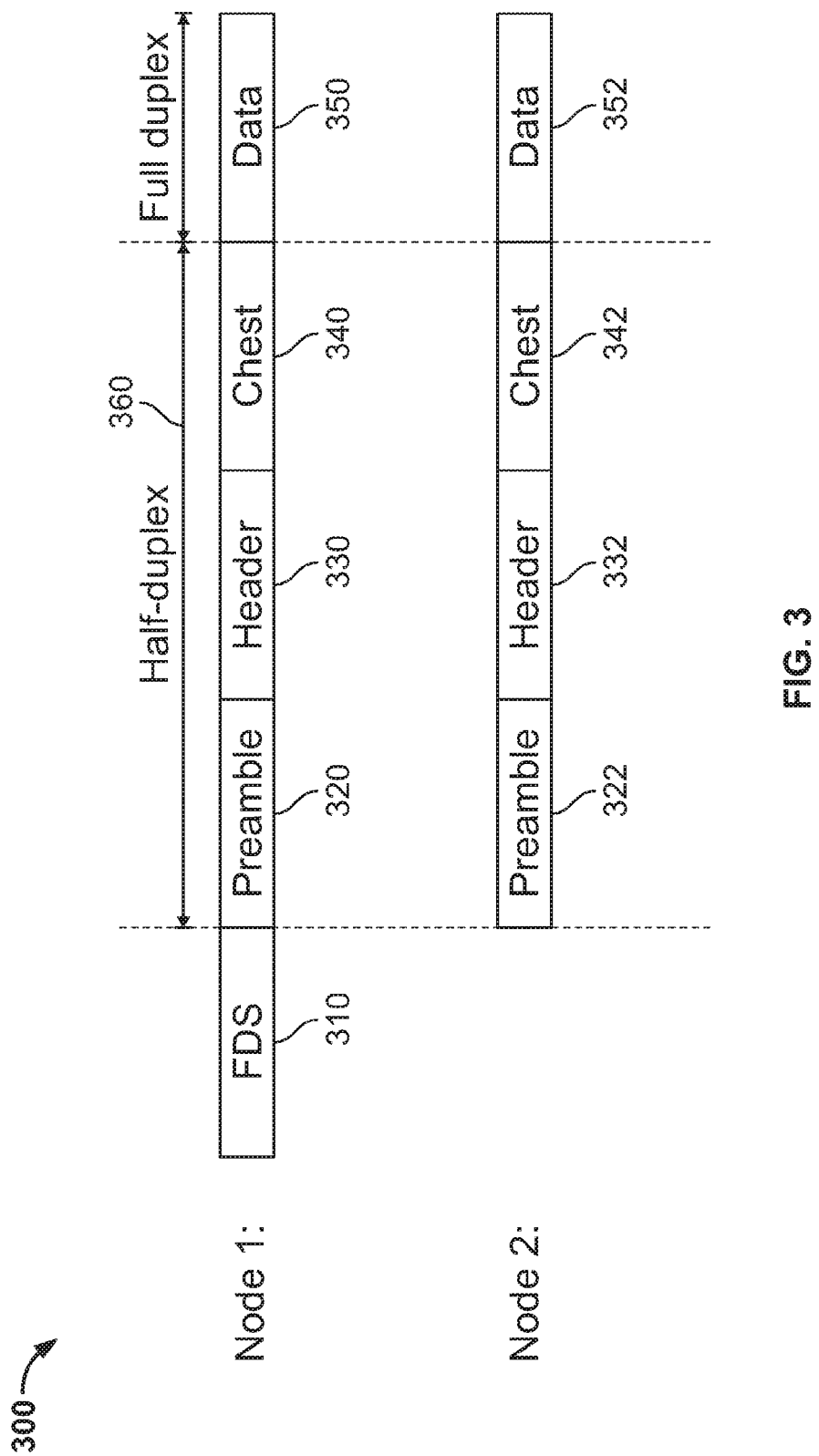
FIG. 3 is a diagram of illustrative frames exchanged in full-duplex communications in accordance with an embodiment of the present disclosure.

In some embodiments, as shown in FIG. 3, the first node and the second node are configured to engage in full-duplex communications by transmitting every portion of the frame except the data portion in an orthogonal manner following transmission to every node of a signal 310 indicating that full-duplex communications will be exchanged in upcoming time slots. For example, in the time slot following transmission of signal 310 indicating full-duplex communications, the first node is configured to transmit a preamble 320, a header 330, and a channel estimate 340 portions of a frame to every node using a first group of carriers (e.g., even carriers) and the second node is configured to transmit a preamble 322, a header 332 and a channel estimate 342 portions using a second group of carriers (e.g., odd carriers). Following the exchange of the preamble 320/322, header 330/332 and channel estimate 340/342 portions, the first and second nodes are configured to begin transmitting data 350/352 portions using all the carriers at the same time and frequency. For example, a first node is configured to transmit full-duplex start signal (FDS) 310 to every node in the network of nodes, using a half-duplex communications mode (e.g., in an orthogonal manner) to initiate full-duplex communications with a particular node. Start signal 310 is configured to precede and be different from first section 210 (FIG. 2). The start signal is configured to identify the second node with which the first node requests to engage in full-duplex communications. Following receipt of the start signal, the first and second nodes exchange frame portions of a frame section 360 to set up full-duplex communications, which are then followed by the full-duplex exchange of data portions 350 from the first node and data portions 352 from the second node. A discussion of a system, including OFDM implementations, in which a start signal is sent to initiate full-duplex communications is described, in concurrently-filed, commonly-assigned U.S. patent application Ser. No. 15/483,429, entitled "METHOD AND APPARATUS FOR FULL-DUPLEX OPERATION IN A MULTIPOINT-TO-MULTIPOINT NETWORK,", which is incorporated by reference in its entirety.

For example, the first node is configured to transmit FDS signal 310 over a communications medium (e.g., wired power line) for receipt by all of the nodes in the network. FDS signal 310 is configured to be composed of a double sequence of known phases. FDS signal 310 is configured to indicate to every other node in the network that the next time slot will be used (e.g., for full-duplex communications). FDS signal 310 is configured to also indicate the identity of the node that will be the second node (e.g., recipient) of the full-duplex communications in the next time slot.

In some implementations, during the next time slot, when the first and second nodes begin setting up to exchange full-duplex communications, a set of orthogonal portions of frame section 360 simultaneously sent by the first and second nodes is configured to be used to exchange channel information. In such circumstances, no echo cancellation may be necessary as orthogonal carriers are used by the first and second nodes (e.g., the nodes communicate using different sets of carriers). The control information that is configured to be exchanged (e.g., sent by each of the first and second nodes at the same time) includes preamble 320/322, header 330/332 and/or channel estimate 340/342. For example, the first node is configured to transmit channel information 340 in section 360 using a first group of carriers 132a-c while the second node transmits channel information 342 in section 360 using a second group of carriers 134a-b (FIG. 1). In some embodiments, channel estimate 340/342 may be exchanged before header 330/332.

In some embodiments, preamble 320 is configured to include a repetition of an OFDM mini-symbol for automatic gain control adjustment. In some implementations, both the first and second nodes are configured to use the same known seed to transmit preamble 320. In such circumstances, the first node is configured to transmit preamble 320 using first group of carriers 132a-c (e.g., even carriers) while the second node is configured to transmit preamble 322 using second group of carriers 134a-b (e.g., odd carriers). In some implementations, since each node transmits in half of the carriers, a 3 dB power boost is configured to be applied by one or both of the first and second nodes. In some implementations, AGC is configured to account for half of the power that is received during the preamble exchange.

In some embodiments, header 330/332 is configured to control signaling, such as frame duration, FEC rate, BATID and/or ACK and/or data. In exchanging header 330/332, the first node is configured to use even-numbered OFDM carriers of subcarrier circuitry 130 while the second node uses odd-numbered OFDM carriers of subcarrier circuitry 130 so that their transmission is orthogonal and there is no need to perform echo cancellation similar to the manner of transmitting the preamble. In such circumstances, the first node is configured to transmit header 330 using first group of carriers 132a-c (e.g., even carriers) while the second node is configured to transmit header 332 using second group of carriers 134a-b (e.g., odd carriers). In such circumstances, a third node that is not part of the full-duplex exchange, is configured to decode headers 330/332 that are exchanged between the first and second nodes. The third node is configured to use information contained in headers 330/332 to determine the duration of the full-duplex communications (e.g., by computing the maximum value that is specified in the headers transmitted by the first and second nodes). In some implementations, a 3 dB power boost is configured to be applied to header 330/332 in a similar manner as the power boost applied to the preamble.

In some embodiments, channel estimate symbol 340/342 (built from a known sequence of phases) is configured to include two OFDM symbols with a guard interval (GI) of, for example, GI=7. Channel estimate 340/342 is configured to enable the first and second nodes to perform echo and remote channel estimation. Channel estimate symbols 340/342 are configured to be encoded in accordance with a Walsh-Hadamard sequence for remote and echo channel estimation. The symbol duration is configured to be the same as the data symbol duration, which is configured to avoid the need to perform interpolation. The exchange of the channel estimate symbol 340/342 is configured to be performed in any number of ways, such as those discussed above. For example, one way to exchange the channel estimate symbol includes the first node transmitting channel estimate symbol 340 in the even carriers, while the second node transmits channel estimate symbol 342 in the odd carriers in a similar manner as the preamble exchange. In such circumstances, both nodes are configured to use the same known seed to generate the channel estimate symbol and exchange the channel estimate symbol in a similar manner as preamble 320/322. Another way to exchange the channel estimate symbol 340/342 includes both nodes transmitting the channel estimate symbol 340/342 using all the carriers, but the first node being configured to transmit two repetitions of the channel estimate symbol 340 (e.g., CHEST & CHEST) while the second node being configured to transmit a first repetition and a negated repetition of the channel estimate symbol 342 (e.g., CHEST & -CHEST). In these circumstances, the first and second nodes are configured to use different seeds to generate the channel estimate symbol. Another way to exchange the channel estimate includes the first node and second node taking turns transmitting the channel estimate symbol 340/342 in all of the carriers. For example, the first node is configured to first transmit the channel estimate symbol 340 while the second node transmits silence and then the second node is configured to transmit the channel estimate symbol 342 while the first node transmits silence.

Following the exchange of the channel estimate and/or header, the first and second nodes begin exchanging data 350/352 in a full-duplex mode. Particularly, the first and second nodes transmit, at the same time and at the same frequency using the same carriers, the data payload symbols 350/352. The first and second nodes are configured to use all of the carriers of subcarrier circuitry 130 and the same or different seeds to exchange the data. For example, the first node is configured to transmit data payload symbol 350 at the same time and at the same frequency as the second node is configured to transmit data payload symbol 352. In order to decode the data symbol 350/352 received, the first and second nodes are configured to perform echo cancellation to remove from the received signals known information that the node transmitted. In some embodiments, the payload data symbol 350/352 is configured to include ACE symbols, ACKs, or dummy data (e.g., to ensure that the duration of the data frame portion transmitted by one node matches the duration of the frame portion transmitted by another node).

FIG. 4 illustrates a process 400 for performing full-duplex communications using a G.hn protocol in accordance with an embodiment of the present disclosure. At 310, a second node of a plurality of nodes with which to engage in full-duplex communications is selected. For example, control circuitry 120 of a first node is configured to select a second node with which to engage in full-duplex communications (FIG. 1).

At 420, a first seed common to the plurality of nodes is retrieved. For example, control circuitry 120 of the first node is configured to retrieve a seed that is associated with all of the plurality of nodes (FIG. 1).

At 430, a search is performed for a second seed that is assigned to the second node, wherein the first and second seeds are used to generate respective first and second sequences of bits, wherein first and second sets of phases are generated based on the first and second sequences of bits, respectively. For example, control circuitry 120 of the first node is configured to search for a second seed that is associated with the second node (FIG. 1). The first and second seeds are used by LFSR seed 1 circuitry 150 and LFSR seed 2 circuitry 152 to generate sequences of bits and output phases based on those bits.

At 440, a first portion of a communications frame is generated for transmission using a half-duplex communications mode, wherein transmissions using the half-duplex communications mode are detectable by each of the plurality of nodes. For example, the control circuitry 120 of the first node is configured to generate first portion 210 that is configured to include a preamble portion and/or a header portion (FIGS. 1 and 2). The preamble is configured to inform recipient nodes that the first node intends to engage in full-duplex communications with a second node.

At 450, a first group of subcarriers in a set of subcarriers is configured to be loaded with a first set of phases generated using the first seed, and a second group of subcarriers in the set of subcarriers is configured to be loaded with a second set of phases generated using the second seed. For example, control circuitry 120 of the first node is configured to load first group 132a-c of subcarrier circuitry 130 with phases from LFSR seed 1 circuitry 150 and the first node is configured to load second group 134a-b of subcarrier circuitry 130 with phases from LFSR seed 2 circuitry 152 (FIG. 1).

At 360, transmission circuitry is configured to be caused to transmit, in the half-duplex communications mode, the first portion (e.g., the preamble) from the first node using the first and second groups of subcarriers. For example, control circuitry 120 of the first node is configured to instruct transmission circuitry 140 to transmit the preamble portion of the frame using the output of subcarrier circuitry 130 (FIG. 1).

The foregoing describes methods and an apparatus for performing full-duplex communications using a G.hn protocol. The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

What is claimed is:

1. A method for performing full-duplex communications using a G.hn protocol, the method comprising:
   selecting, by a first node of a plurality of nodes, a second node of the plurality of nodes with which to engage in full-duplex communications;
   retrieving a first seed common to the plurality of nodes;
   searching for a second seed assigned to the second node, wherein the first and second seeds are used to generate respective first and second sequences of bits, wherein first and second sets of phases are generated based on the first and second sequences of bits, respectively;
   generating, by the first node, a first portion of a communications frame for transmission using a half-duplex communications mode, wherein transmissions using the half-duplex communications mode are detectable by each of the plurality of nodes;
   loading a first group of subcarriers in a set of subcarriers with the first set of phases generated using the first seed and loading a second group of subcarriers in the set of subcarriers with the second set of phases generated using the second seed; and
   transmitting, in the half-duplex communications mode, the first portion from the first node using the first and second groups of subcarriers.

2. The method of claim 1, wherein the first group of subcarriers includes only even subcarriers in the set of subcarriers and the second group of subcarriers includes only odd subcarriers in the set of subcarriers, wherein the first frame includes a preamble portion, a header portion, an automatic gain control portion, a channel estimate portion, and a data portion, and wherein the first portion includes the preamble portion.

3. The method of claim 2, wherein the preamble portion indicates to each of the plurality of nodes that subsequent portions, following the header portion, of the frame will be transmitted using a full-duplex communications mode.

4. The method of claim 1 further comprising applying the first and second seeds to a linear feedback shift register (LFSR) to generate the first and second sets of phases.

5. The method of claim 1, further comprising synchronizing an exchange of full-duplex frame portions by:
   measuring a propagation delay between each of the first and second nodes and a reference node that provides a common time reference; and
   adjusting a transmission time of the full-duplex frame portions based on the propagation delay.

6. The method of claim 1, wherein a second portion of the frame is transmitted using the half-duplex communications mode and includes header that indicates a duration of the frame.

7. The method of claim 1, wherein the first portion includes a preamble, further comprising:
   receiving, with the second node, the first portion;
   determining, with the second node, whether the first portion was transmitted using the second seed assigned to the second node; and
   in response to determining the first portion was transmitted using the second seed assigned to the second node, transmitting a full-duplex frame to the first node in full-duplex, wherein the full-duplex frame is decodable by the first node and not by other nodes in the plurality of nodes.

8. The method of claim 7, wherein the full-duplex frame includes a plurality of portions, wherein the plurality of portions includes an automatic gain control portion, at least one channel estimate portion, a header portion and a data portion.

9. The method of claim 7, wherein the full-duplex frame includes a predetermined channel estimate portion and a negated predetermined channel estimate portion, further comprising:
   selecting a seed different from a seed associated with a channel estimation portion transmitted by the first node;
   loading subcarriers of the second node with phases generated using the selected seed; and
   transmitting a first repetition of the predetermined channel estimate portion using the subcarriers of the second node and a second repetition of the negated predetermined channel estimate portion using the subcarriers of the second node.

10. The method of claim 7, wherein the full-duplex frame is transmitted by the second node at a same time and at a same frequency as a second portion of the frame is transmitted by the first node.

11. An apparatus for performing full-duplex communications using a G.hn protocol, the apparatus comprising:
   transmission circuitry associated with subcarrier circuitry, wherein the subcarrier circuitry includes a set of subcarrier components; and
   control circuitry of a first node of a plurality of nodes configured to:
   select a second node of the plurality of nodes with which to engage in full-duplex communications;
   retrieve a first seed common to the plurality of nodes;

search for a second seed assigned to the second node, wherein the first and second seeds are used to generate respective first and second sequences of bits, wherein first and second sets of phases are generated based on the first and second sequences of bits, respectively;

generate a first portion of a communications frame for transmission using a half-duplex communications mode, wherein transmissions using the half-duplex communications mode are detectable by each of the plurality of nodes;

load a first group of subcarriers in the set of subcarriers with a first set of phases generated using the first seed and load a second group of subcarriers in the set of subcarriers with a second set of phases generated using the second seed; and cause the transmission circuitry to transmit, in the half-duplex communications mode, the first portion from the first node using the first and second groups of subcarriers.

12. The apparatus of claim 11, wherein the first group of subcarriers includes only even subcarriers in the set of subcarriers and the second group of subcarriers includes only odd subcarriers in the set of subcarriers, wherein the first frame includes a preamble portion, a header portion, an automatic gain control portion, a channel estimate portion, and a data portion, and wherein the first portion includes the preamble portion.

13. The apparatus of claim 12, wherein the preamble portion indicates to each of the plurality of nodes that subsequent portions, following the header portion, of the frame will be transmitted using a full-duplex communications mode.

14. The apparatus of claim 11 further comprising a linear feedback shift register (LFSR), wherein the control circuitry is further configured to apply the first and second seeds to the LFSR to generate the first and second sets of phases.

15. The apparatus of claim 11, wherein the control circuitry is further configured to synchronize an exchange of full-duplex frame portions by:
  measuring a propagation delay between each of the first and second nodes and a reference node that provides a common time reference; and
  adjusting a transmission time of the full-duplex frame portions based on the propagation delay.

16. The apparatus of claim 11, wherein a second portion of the frame is transmitted using the half-duplex communications mode and includes header that indicates a duration of the frame.

17. The apparatus of claim 11, wherein the first portion includes a preamble, wherein the second node includes control circuitry, receiver circuitry and transmission circuitry, wherein the control circuitry of the second node is configured to:
  receive the first portion from the receiver circuitry;
  determine whether the first portion was transmitted using the second seed assigned to the second node; and
  in response to determining that the first portion was transmitted using the second seed assigned to the second node, cause the transmission circuitry of the second node to transmit a full-duplex frame to the first node in full-duplex, wherein the full-duplex frame is decodable by the first node and not by other nodes in the plurality of nodes.

18. The apparatus of claim 17, wherein the full-duplex frame includes a plurality of portions, wherein the plurality of portions includes an automatic gain control portion, at least one channel estimate portions, a header portion and a data portion.

19. The apparatus of claim 17, wherein the control circuitry of the second node is configured to:
  select a seed different from a seed associated with a channel estimation portion transmitted by the first node;
  load subcarriers of the second node with phases generated using the selected seed; and
  instruct the transmission circuitry of the second node to transmit a first repetition of a predetermined channel estimate portion using the subcarriers of the second node and a second repetition of a negated predetermined channel estimate portion using the subcarriers of the second node.

20. The apparatus of claim 17, wherein the control circuitry of the second node is configured to transmit the full-duplex frame at a same time and at a same frequency as the control circuitry of the first node transmits a second portion of the frame.

21. A method for performing full-duplex communications using a G.hn protocol, the method comprising:
  selecting, by a first node of a plurality of nodes, a second node of the plurality of nodes with which to engage in full-duplex communications, wherein the plurality of nodes are coupled to each other over a communications network;
  transmitting a signal in a half-duplex communications mode over the communications network, wherein transmissions over the communications network in the half-duplex communications mode are detectable by all of the plurality of nodes;
  causing each of the plurality of nodes to determine, based on receiving the signal, that subsequent transmissions over the communications network will be performed in a full-duplex communications mode; and
  causing the second node to establish, based on receiving the signal, full-duplex communications in a full duplex communications mode with the first node, wherein transmissions in the full duplex communications mode are decodable by the first node and not by other nodes in the plurality of nodes.

* * * * *